United States Patent

Rovell

[11] 4,038,968
[45] Aug. 2, 1977

[54] AIR SCREEN FOR FOOD WARMING TABLE

[76] Inventor: Alfred Rovell, 2623 New Jersey Road, Lakeland, Fla. 33803

[21] Appl. No.: 583,436

[22] Filed: June 3, 1975

[51] Int. Cl.² .............................................. A47G 23/04
[52] U.S. Cl. .................................. 126/261; 126/21 A; 99/476
[58] Field of Search ...................... 126/261, 262, 21 A; 432/64; 62/256; 99/474, 475, 476, 447, 407; 98/36; 426/520

[56] References Cited

U.S. PATENT DOCUMENTS

| 2,833,906 | 5/1958 | Wingo | 126/261 |
|---|---|---|---|
| 2,967,404 | 1/1961 | Detwiler | 62/256 |
| 3,163,024 | 12/1964 | Beckwith et al. | 62/256 |
| 3,474,724 | 10/1969 | Jenn | 99/476 |
| 3,502,020 | 3/1970 | Bressickello | 98/36 |
| 3,561,230 | 2/1971 | Gatton et al. | 62/256 |
| 3,713,401 | 1/1973 | McClurkin | 432/64 |
| 3,780,794 | 12/1973 | Staub | 126/21 A |

*Primary Examiner*—John J. Camby
*Assistant Examiner*—Larry I. Schwartz
*Attorney, Agent, or Firm*—Fidelman, Wolffe & Waldron

[57] ABSTRACT

An air curtain is provided across the top of a food warming table, such as is employed in cafeterias for keeping food hot for serving. An air stream flows across the top of the pans holding the cooked food, where it picks up heat, moisture and flavor components, and is continuously recirculated to form an air curtain. Which retards the outflow of moisture and heat from the surface of the food. Keeping a cushion of hot moist air on the food maintains it in a hot and moist condition. Additionally, the air curtain acts to keep dust and insects away from the food surface.

6 Claims, 5 Drawing Figures

AIR SCREEN FOR FOOD WARMING TABLE

BACKGROUND OF THE INVENTION

This invention relates to food warming devices and more particularly to an air curtain to keep food in a warming table in a hot, moist and appetizing appearing condition by preventing loss of moisture and promoting retention of heat.

The overall object of this invention is to provide an apparatus and method for keeping food placed on a warming table in a hot moist and appetizing appearance by providing an air curtain which is recirculated over the food.

Another object of the invention resides in the provision of a duct for recirculating an air stream over a food receptacle placed on a warming table.

A further object resides in the provision of at least one air filter within the duct to filter out any solids which may have been picked up by the air stream.

A further object is to provide a blower or fan means to impel the air stream.

Further objects will become apparent from the following specification and claims.

SUMMARY OF THE INVENTION

The invention herein is an improvement in food warming tables, such as a stream table or the like employed in cafeterias for keeping food warm while serving. A circulating air stream is provided over the food surface in the serving pan which acts to cut down loss of moisture and aids in the retention of heat, while acting as a screen to keep dust and insects away from the food.

One of the problems in serving food in a cafeteria is how to keep food hot and in an appetizing appearing condition after it leaves the kitchen and before the customer selects its. Warming tables, wherein the food is kept hot in serving pans by steam, gas heat or electrical heat are commonly employed. However, if the food is kept in the pans beyond a certain time, it becomes wilted or dried-out in appearance and loses eye-appeal. Also, the food is unprotected from its surroundings so that extraneously materials, such as dust, dirt or insects may fall in.

Thus, green vegetables, soups, mashed potatoes to name a few typical cafeteria foods, are often exposed for considerable periods of time to the cooler room temperature while kept on the warming table. This causes crusting, skin build up, and especially with vegetables, discoloration. Very often these undesirable changes in appearance render the foods unsalable and they must be discarded.

I have discovered that these undesirable effects can be prevented to a large degree by providing an air curtain over these foods. This serves to retard the loss of heat from the product surface and acts to maintain a cushion of hot moist air thereon, thereby preventing discoloration and drying out effects. The improved warming table herein contains a heated trough-like container, in which a pan or tray containing food is supported. Air conduit and blower means are provided for directing an air stream across the open top surfaces of the food trays containing the food, and for recirculating the air stream over the food surface. Since the air curtain does not present any physical barrier, the foods can be dipped up and served right through it.

Figure 1:
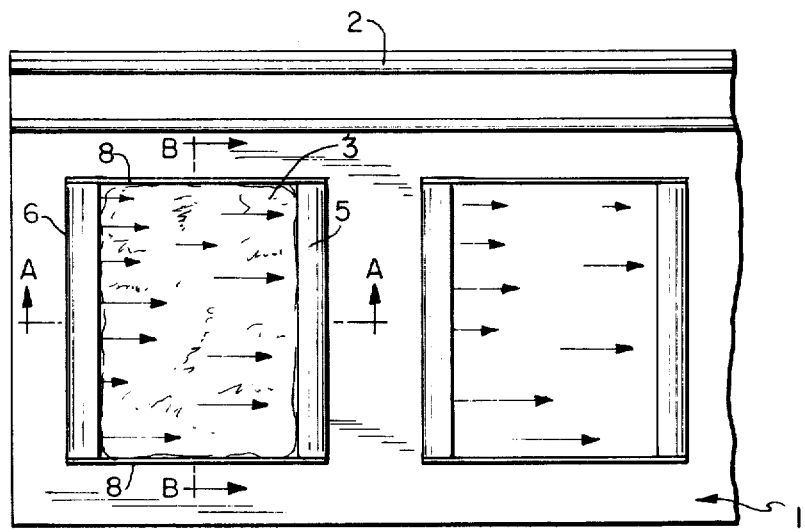
FIG. 1 is a plan view of a warming table showing the food pans and serving rails.
Figure 2:
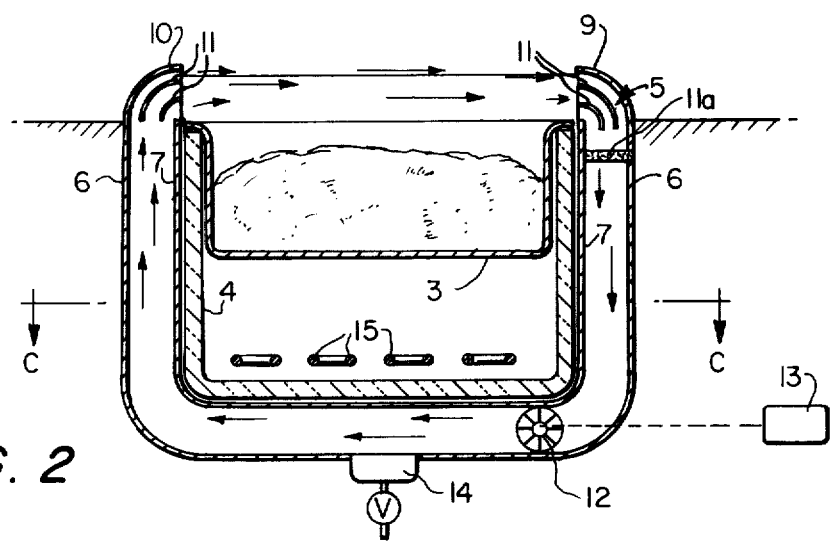
FIG. 2 is a sectional view taken along line A—A of FIG. 1.

Referring to FIG. 1, reference number 1 is a hot table having the usual serving rails 2 in front and food pans or trays 3. As best shown in FIG. 2, the food pans are supported in a hot food storage receptacle 4 which is mounted in table 1. Receptacle 4 may be heated by any conventional means such as steam, gas or electricity. In the embodiment shown the receptacle is heated by a resistance heating unit 15.

Figure 3:
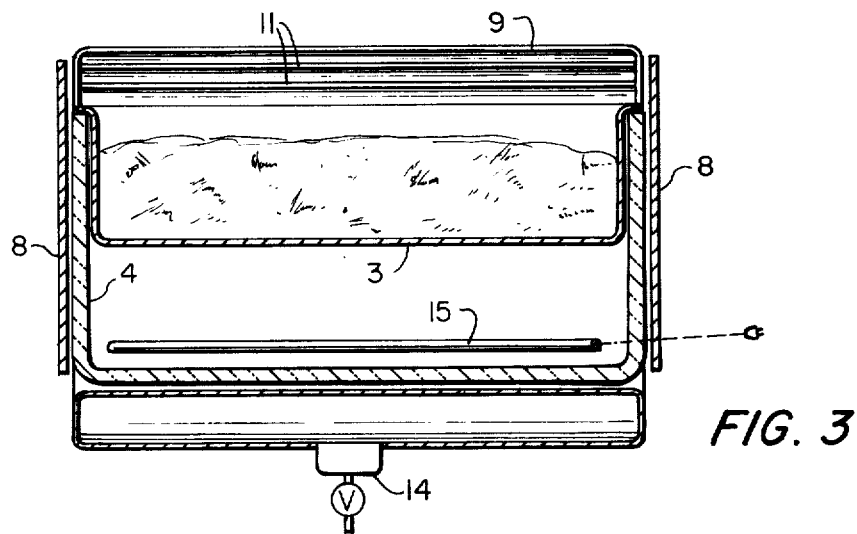
FIG. 3 is a sectional view taken along line B—B of FIG. 1.
Figure 4:
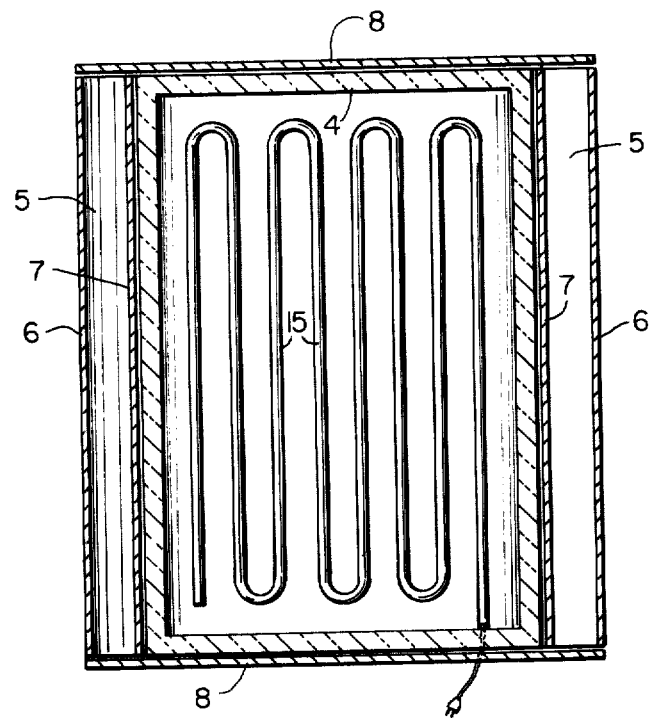
FIG. 4 is a sectional view taken along line C—C of FIG. 2.

As shown in FIGS. 1-4 the receptacle is of a general rectangular shape having the sides normal to the rails as the longer. An air duct 5 consisting of two wall sections 6 and 7 with a space therebetween is of substantially the same length as the receptacle and passes around the side walls and bottom thereof. The air duct is closed off at both ends by a rigid sheet or plate 8, forming a structure whose cross section is best shown in FIG. 4. The upper open ends of the duct face inwardly as shown at 9 and 10, which are located immediately above pan 3. Louvers 11 may be provided to guide the air stream at 9 and 10. Duct 5 is mounted in the table top so that upper ends 9 and 10 protect above the counter as shown, and hot receptacle 4 fits snugly therein. The upper ends of plates 8 are at substantially the same height above the table as duct ends 9 and 10 and thus act as a shield for the outer edges of the air stream, as best shown in FIGS. 1 and 3.

A removable filter 11a, which may be made of inert, semi-rigid cleanable filter materials known to the art, such as fiber glass, for example, is provided near the top of the right hand portion of the duct, as shown in FIG. 2. This serves to screen or filter out any dust particles, etc. that may be carried along with the air current. If necessary for access to the filter, the upper portion of side 6 of the duct, just above the top of the table 1, may be made removable, as by being formed in two sections joined by mechanical fasteners such as sheet metal screws.

Air is circulated in the duct work by means of a squirrel-cage fan 12 driven by an electric motor 13. If desired additional louvers may be located within the duct work to direct the flow of air. The fan may be located within a baffle plate, and a plurality of fans may be employed. Fan speeds may be varied as desired by control means known to the art. A drain 14 is provided at the lower portion of the duct so that liquid condensation may be removed.

Figure 5:
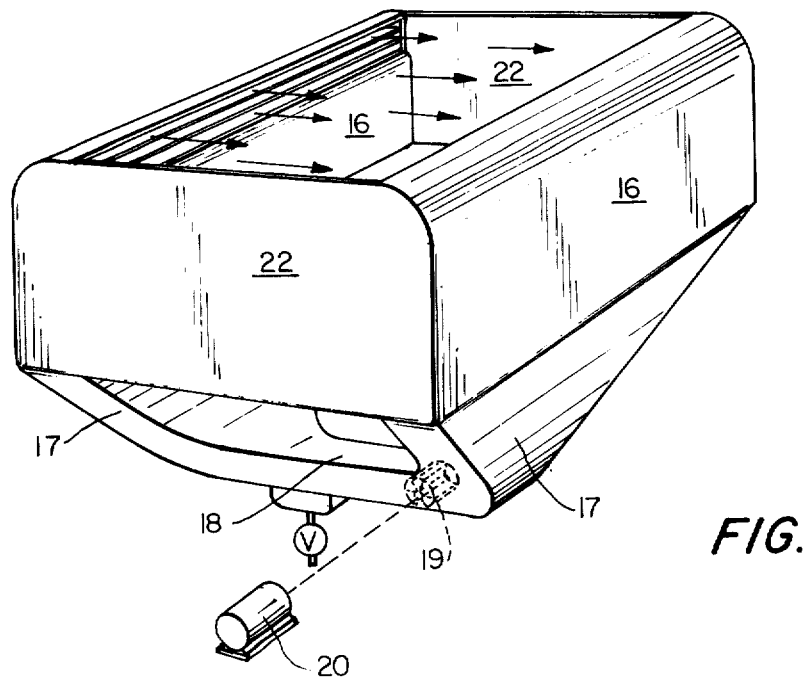
FIG. 5 is a perspective view of a modified form of the air duct.

Instead of the duct structure shown in FIGS. 1-4, modified form can be employed as shown in FIG. 5. In this modification side ducts 16 neck down at 17 to receive transverse bottom conduit 18. Squirrel-cage fan 19 driven by motor 20 causes the air to circulate in the conduits. Louvers and baffles may be provided to guide the air flow if required and drain 21 is provided. Side plates 22, 22 join the ducts 16, 16 to form a rectangular open space to remove condensate. As in the embodiment of FIG. 3, the hot food receptacle 4 fits into the rectangular open space defined by the ducts and plates.

While the air flow has been shown as parallel to the short sides of the rectangular opening, it may, if desired, be so directed as to be parallel to the longer sides. Also, instead of having the air flow traverse only one pan, it is possible to have two or more pans traversed by an air stream. If desired, the ducts can be insulated and/or the air stream can be heated as by resistance coils placed inside or outside the ducts.

What is claimed is:

1. A food warming table for maintaining food at a hot serving temperature and to prevent loss of moisture which comprises:
    at least one trough-like receptacle having heating means located at its lower portion;
    at least one stationary food receiving pan location within the said receptacle having hot food therein and spaced above said heating means, whereby said pan is heated by the heating means;
    the trough-like receptacle and the pan having upper perimeters that are substantially flush and horizontal;
    a moving air current confined essentially to the lateral boundaries of the pan, and moving in a direction parallel to the plans of the upper perimeter whereby an air curtain over the food in the pan is maintained; said air current being adapted to absorb moisture, heat and flavor components from the food in its passage over the said food, so that said air current is heated, moist and contains flavor components;
    means for accepting the air current at a location adjacent one end of the pan and redirecting it to an opposite end of said pan; and
    means for imparting motion to said air current.

2. The apparatus of claim 1 wherein the air current is conveyed from a location adjacent one end of the pan to a location adjacent another end of the pan via duct means, said duct means passing beneath the trough-like receptacle.

3. The apparatus of claim 2 wherein the ducts have upper ends adjacent the said ends of the pan, the upper duct ends extending transversely across the pan ends, and the said duct ends being open, whereby the air current can leave one duct end, blanket the pan and its contents and enter the other duct end.

4. The apparatus of claim 3 having a blower or fan means for impelling the air stream.

5. The apparatus of claim 4 wherein the duct has a drain at a low point for removing any condensate.

6. The apparatus of claim 5 having additionally a filter located in the duct means for screening out particulate matter from the air current.

* * * * *